United States Patent [19]

Marianne et al.

[11] Patent Number: 4,856,698
[45] Date of Patent: Aug. 15, 1989

[54] INSTALLATION FOR AUTOMATIC ASSEMBLY OF COMPONENTS AND, IN PARTICULAR, COMPONENTS OF MOTOR VEHICLE BODIES

[75] Inventors: Jean J. Marianne, Combs La Ville; Pierre Jablonski, Creteil, both of France

[73] Assignee: Sciaky S.A., Vitry Sur Seine, France

[21] Appl. No.: 208,168

[22] Filed: Jun. 16, 1988

Related U.S. Application Data

[63] Continuation of Ser. No. 855,804, Apr. 24, 1986, abandoned.

[51] Int. Cl.$^4$ .............................................. B23K 37/00
[52] U.S. Cl. ...................................... 228/4.1; 228/45; 901/7; 29/430
[58] Field of Search ................ 901/7, 16, 42; 228/4.1, 228/45; 198/346.1; 29/429, 430

[56] References Cited

U.S. PATENT DOCUMENTS

| | | | |
|---|---|---|---|
| 4,256,947 | 3/1981 | De Candia | 901/7 |
| 4,448,341 | 5/1984 | Fujikawa et al. | 228/4.1 |
| 4,483,476 | 11/1984 | Fujikawa et al. | 228/4.1 |
| 4,589,199 | 5/1986 | Ohtaki et al. | 29/430 |
| 4,600,136 | 7/1986 | Sciaky et al. | 228/4.1 |

FOREIGN PATENT DOCUMENTS

| | | | |
|---|---|---|---|
| 3111706 | 1/1982 | Fed. Rep. of Germany | 198/346.1 |
| 0036869 | 4/1978 | Japan | 901/16 |
| 0073500 | 6/1980 | Japan | 228/45 |
| 0022633 | 2/1983 | Japan | 198/346.1 |

Primary Examiner—Fred Silverberg
Assistant Examiner—Karen Skillman
Attorney, Agent, or Firm—Clifford A. Poff

[57] ABSTRACT

Installations for assembling by welding or other means comprising means for positioning the various constituent parts, at least one programmeable means for assembly by welding or other means.

An installation characterised in that it comprises at least one gantry (10, 11) the upper face of which accommodates the programmeable welding or other means which can be moved on at least one mobile cross member (10$_1$, 11$_1$) and in that means (13, 14) are provided to move constituent parts in the lower zone of the gantry and to immobilise them under the welding means.

4 Claims, 4 Drawing Sheets

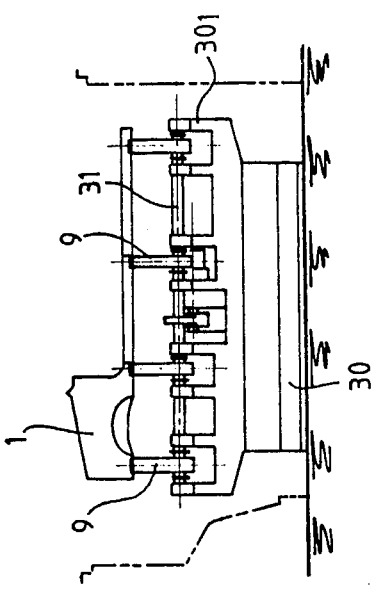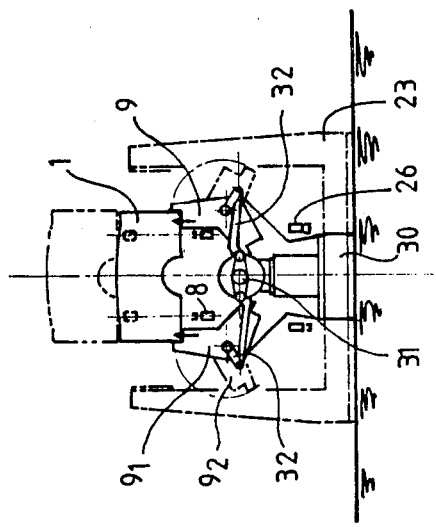

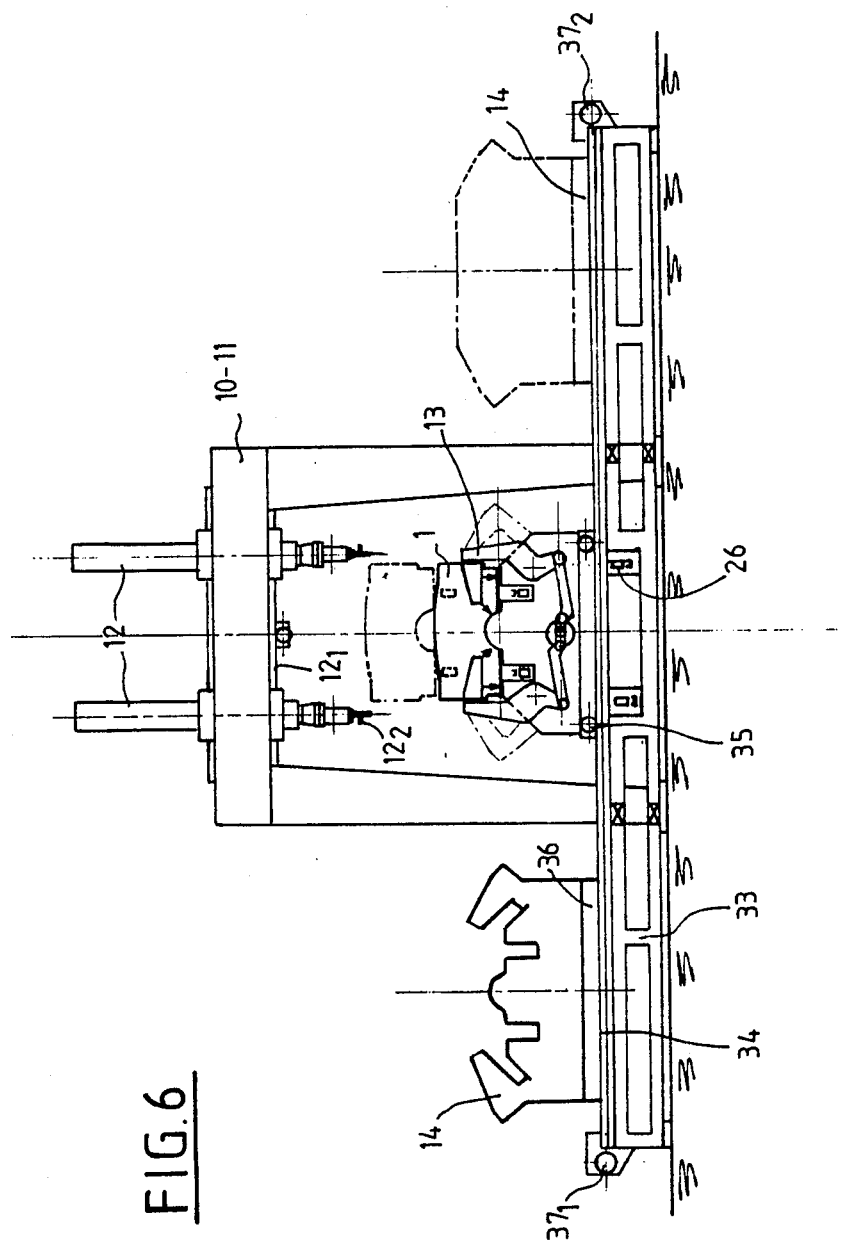

INSTALLATION FOR AUTOMATIC ASSEMBLY OF COMPONENTS AND, IN PARTICULAR, COMPONENTS OF MOTOR VEHICLE BODIES

This is a continuation of co-pending application Ser. No. 855,804 filed on Apr. 24, 1986 now abandoned.

The invention relates to an installation for assembling components and, more particularly, motor vehicle bodies.

Installations of this type are already known which comprise multiple stations disposed in lines and associated with systems for automatically conveying the parts from one station to the following station at each of which welding, assembly, bolting, checking or other operations are carried out.

Apart from the conveying means, these installations employ positioning tools which are designed to ensure precise relative positioning of the parts or sub-assemblies of the body to be assembled by welding, firstly in a temporary fashion by one or more tack-welding operations and, then, in the course of a final welding operation.

However, these various operations have to be carried out while the elements of the body are positioned correctly and, in particular, while the various constituent parts or sub-assemblies are positioned precisely in relation to one another with the aid of positioning tools.

However, up to now, these positioning tools have been designed in such a way that they make it difficult for the welding heads of the programmeable welding robots used to get at the body.

This difficulty is encountered in particular when it is desired to produce installations capable of assembling a plurality of types of component on the same transfer line.

In addition, these plant installation and design problems are increased when it is desired to step up the production rates, which entails increasing the number of welding tools and, thus, designing positioning tools adapted for passage and movement of the welding heads.

It will also be noted that, at present, the development of the markets for building and selling motor vehicles means that these assembly installations must be capable of rapid adaptation to the production of a new model and to production rates, which could not be achieved until now with known assembly installations.

The object of the present invention is in particular to overcome these drawbacks and, to this end, relates to an installation for assembly by welding or other means comprising means for positioning the various constituent parts, at least one programmeable means for assembly by welding or other means, said installation being characterised in that it comprises at least one gantry the upper face of which accommodates the programmeable welding or other means mobile on at least one moving cross member, and in that means are provided to move constituent parts in the lower zone of the gantry and to immobilise them under the welding means.

In accordance with another feature of the invention, the gantry supporting the welding means comprises a transverse base on which the positioning tools can move.

The invention is illustrated by way of non-limiting examples in the attached drawings in which:

FIGS. 4 and 5 are respectively end and side views of an embodiment of the receiving station of the installation in FIG. 1;

FIG. 6 is a side view of an embodiment of the welding station in FIG. 1.

The object of the present invention is to define the construction of an assembly module in which the means for welding and the tools for positioning the constituent parts to be welded are disposed in such a way as not to interfere with one another when they move so as to allow great freedom in the design, number and functional movement of these tools and welding means, irrespective of the type of part to be assembled, the number and the position of the spot welds or the desired working speed.

Another object of the present invention, affecting the installation itself, is to provide an economical solution to the problems posed by current installations, in particular by permitting its total adaptation so that it can be applied precisely to every case which may arise when automatically assembling components, by permitting this installation to develop later to adapt to different products and to new models.

In fact, the invention makes it possible to make provision for and implement the functional stations needed for the production of a plurality of different types of sub-assemblies or assemblies, i.e. the total nominal product range, with precision in terms of nature and number, without compromising any future development by modifying the nature or number of these stations.

Figure 1:
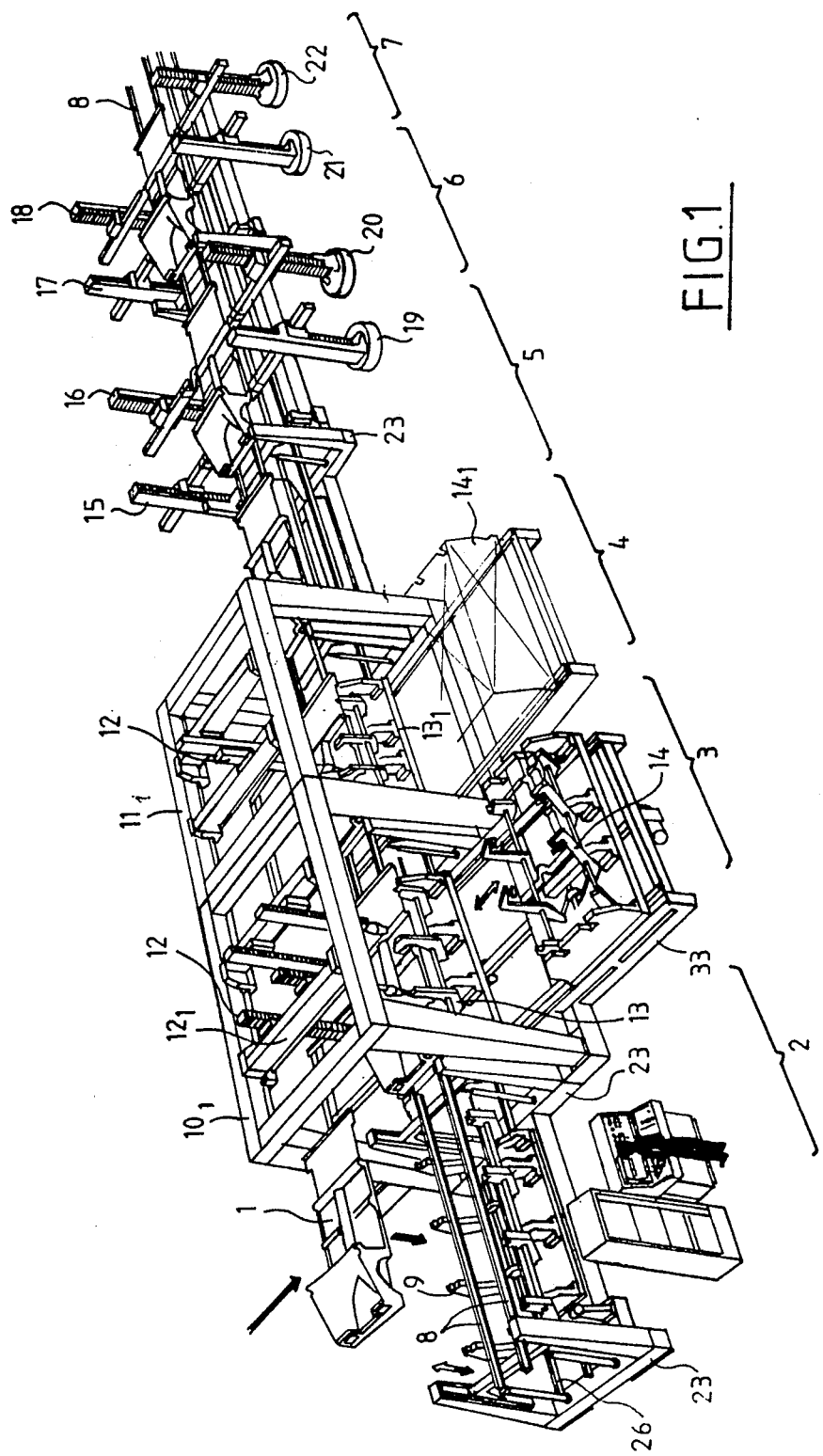
FIG. 1 is an overall diagrammatic perspective view of an installation in accordance with the invention.

The installation in accordance with the invention shown in FIG. 1, which is taken by way of an example, is designed for automatic assembly of motor vehicle bodies by welding frame elements 1.

These various elements 1 are successively conveyed automatically to various modules 2, 3, 4, 5, 6 and 7 with the aid of a pair of transfer bars 8 which run the length of the installation and can be moved vertically on the one hand and horizontally on the other by longitudinal movement.

These diverse modules thus comprise:

A station 2 for receiving the body frame 1, this station 2 being provided to this end with means 9 for receiving the frame, A first and a second so-called "tack-welding" station 4 taking the form of gantries 10 and 11, these stations being designed to position the various frame elements or sub-assemblies by spot welds. These tack-welding stations comprise various welding robots 12 that can be moved vertically on cross members $12_1$ which in turn can be moved longitudinally on the upper frames $10_1$, $11_1$ of the gantries 10, 11 so that they can be located through the action of programmeable control means in pre-determined positions corresponding to the spot welds to be produced on the frame. At their base these gantries 10 and 11 of the tack-welding stations also comprise interchangeable tools 13, $13_1$ and 14, $14_1$ which can be moved horizontally at right angles to the pair of transfer bars 8 in order to locate the positioning tool 13, $13_1$ or 14, $14_1$ corresponding to the type of frame to be produced in each case under this pair of bars. Thus, it can be seen that this arrangement eliminates any interference between the positioning tools and the welding robots and that these means can be varied in terms of number, design, positioning and movement without interfering with one another given that the robots are suspended in the upper part of the gantries in such a way that they can be moved in space along three cartesian axes, whereas the tools for positioning the body parts and, in particular, its frame, can be moved horizontally at the base of this gantry and take up a precise position under the welding robots.

A checking station 5 which, to this end, comprises means designed to check that the tack welds have been produced satisfactorily and that the dimensions of the frame are correct. This checking station 5, like the following two finishing stations 6 and 7, comprises receiving means (not shown) similar to the receiving means 9 of the station 2.

A first and a second finishing station 6 and 7 provided with welding robots 15, 16, 17, 18, 19, 20, 21, and 22 designed to produce the spot welds finally assembling the frame the various elements of which have already been positioned by tack welds produced in stations 3 and 4.

The stations comprise aligned supporting structures 23 which are equidistant in order to define modules each capable of interchangeably accommodating a system of tools for assembling the frame 1 or any other sub-assembly, or even a system for supplying the parts to be assembled together. To this end, each tool system and/or system for supplying parts is fixed detachably to two equidistant adjacent supporting structures 23.

Each of these stations defining a module to accommodate a tool system comprises the U-shaped supporting structure 23, a pair of sections of transfer bars 24 and a pair of sections of control bars 25, these sections 24 and 25 being respectively of uniform length in all the stations and being joined end to end at $24_1$ and $25_1$ level with each U-shaped supporting structure 23 in order to form the pair of transfer bars 8 and a pair of control bars 26 which are rectilinear and also extend over the entire length of the installation.

The transfer bars 8 thus formed by sections of uniform length assembled end to end slide longitudinally in roller blocks 26 which guide them. These roller blocks—one per bar per station—are supported by an element 27 in the form of a cross member which can be moved vertically and is guided in slides in each of the two uprights $23_1$ of the U-shaped structure 23.

The raising and lowering of the pair of transfer bars 8 through the intermediary of the cross members 27 is obtained through systems of links and cranks operated simultaneously in all the stations by the pair of control bars 26 formed by the sections of uniform length 25 assembled end to end.

Each U-shaped structure 23 of each station also comprises a pair of air cylinders 29 which receive air at a pressure that can be adjusted as a function of the load supported by the cross members 27.

The pair of transfer bars made to move vertically by the control bars 25 comprises carriers 30 which accommodate the frame 1 to be welded in order to position it correctly, in particular so that it can be taken over by the receiving means 9 of the receiving station 2 or of the finishing stations 6 and 7 and so that it can be taken over by the tools 13, $13_1$ or 14, $14_1$ of the tack-welding stations 3 and 4.

Figure 3:
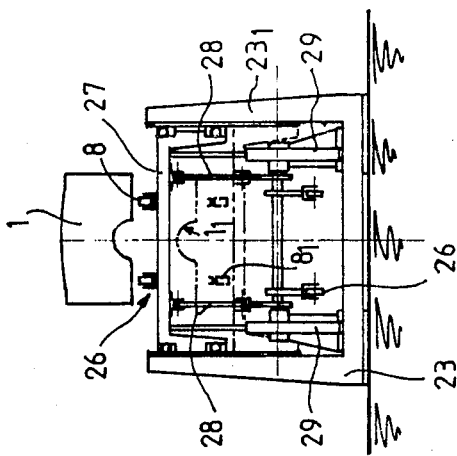
FIGS. 2 and 3 are end and side views of an embodiment of one transfer module of the installation.

When raised and lowered, the frame 1 adopts its lowered working position $1_1$ when the transfer bars are in their lowered position $8_1$ (see dotted lines in FIG. 3).

Figure 2:
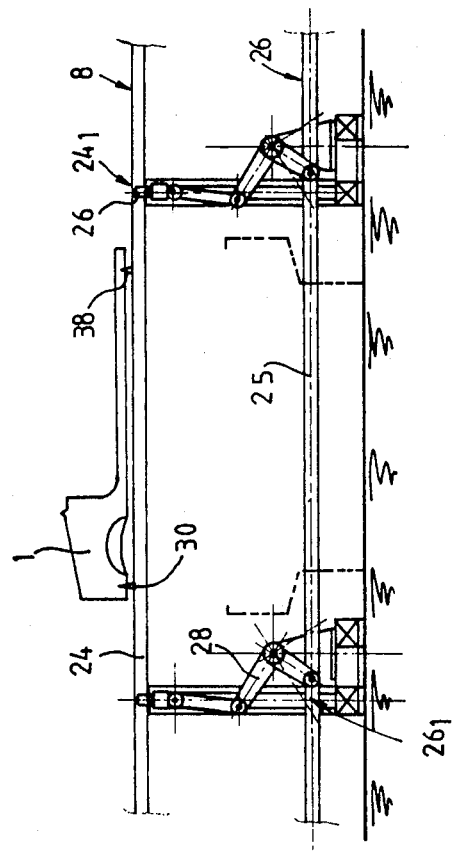

When the transfer bars 8 are raised (see solid lines in FIGS. 2 and 3), these bars are made to describe a longitudinal reciprocating movement through the action of a driving means, the amplitude of this movement corresponding to the length of a station 2, 3, 4, etc. in order to transfer the frame 1 from one station to the following station. When the longitudinal transfer is completed by the bars 8 sliding in the roller blocks 26, the control bars 26 are operated so as to bring these bars 8 and the frames 1 to the lowered position in which they are taken over by the receiving means 9 and the tools 13, $13_1$ or 14, $14_1$ while the various welding robots 12, 15, 16, 17, 18, 19, 20, 21 and 22 produce the necessary spot welds for tack-welding the frame or final assembly.

FIGS. 4 and 5 show the receiving means 9 that can be provided in various stations depending on the work to be carried out therein and, for instance, in the embodiment example shown in FIG. 1, these receiving means will be provided in stations 2, 5, 6 and 7.

These receiving means are composed of a base 30 the length of which corresponds to the constant spacing between pairs of supporting structures 26. This base is provided with mountings $30_1$ carrying a rotatable crank 31 which controls the tilting of the receiving means 9 through the intermediary of linkages 32, thus enabling said receiving means to adopt two positions $9_1$ or $9_2$ to bring into operation one or other of the two sets of pilot carriers positioning one or other of the two types of body frame in its lowered working position (shown by the solid lines in FIG. 4).

The tack-welding stations 3 or 4 are shown in FIG. 6.

The gantries 10 or 11 of this station are fixed or linked detachably to two consecutive U-shaped structures 23 and comprise the robotized welding means 12 manoeuvering the welding heads $12_2$ throughout the working zone.

A base 33 aligned transversely relative to the transfer bars 8 is disposed between the uprights of these gantries. This base 33 carries the tools 13 or 14 and $13_1$ or $14_1$ respectively on rails 34. These tools can move on the rails 34 through the intermediary of rollers 35 so as to be able to adopt a working position inside the gantry or a waiting position outside the gantry, depending on the type of frame to be welded.

These tools themselves have a universal base 36 on which are disposed the specific tools for each frame to be assembled.

The movement of these tools is controlled by the motors $37_1$, $37_2$.

Thus, it will be noted that in accordance with the invention the working stations of the installation define modules each comprising, in addition to the tooling specific to each station, a pair of sections 24 of the transfer bars 8, a pair of sections 25 of the control bars 26 and a U-shaped supporting structure 23 provided with means linking the control bars to the transfer bars for their guidance and lateral movement.

Thus, the result is a modular installation in which the tools of each station can be combined in any order to meet any production requirements. Moreover, with any combination, it is possible to rapidly adapt the system thus formed to at least two assemblies of different forms by transposing the tools 13 and 14 and $13_1$ and $14_1$ of the tack-welding stations 3 and 4 for example.

Thus, due to its modular construction, such an installation can be provided for one type of production of given parts and be adapted if necessary to any other production by adding or eliminating stations and by adapting specific tools in each of these stations, while retaining the same basic elements of the station which convey the sub-assemblies to a following station.

We claim:

1. Installation for assembling various constitute or subassembly parts, said installation including:
    at least one programmable welding robot;
    a transfer line having a plurality of consecutively arranged stations spaced apart by equal distances with each of the distances corresponding to a predetermined length dimension;
    at least one gantry having a length corresponding to said predetermined length dimension for forming part of one of said station, said gantry including an upper elevated frame with at least one horizontally movable cross member supporting said programmable welding robot for vertical movement of the robot relative to the cross member;
    a base movable transversely of said transfer line into and out of a lower part of said gantry below said elevated frame, said base carrying positioning members for said parts;
    transfer bars extending along the plurality of said stations of said transfer line for carrying a subassembly to said gantry for support by said base; and
    means for lowering said transfer bars to place said parts on positioning members of said base by lowering of said bar when the base is in the lower part of said gantry.

2. The installation according to claim 1 further including a second gantry having a length corresponding to said predetermined length dimension, said at least one gantry and said second gantry being detachably linked to respective consecutive ones equal distant support structures.

3. The installation according to claim 2 further including a second programmable welding robot; and wherein said second gantry includes an upper elevated frame with at least one horizontally movable cross member supporting said second programmable robot for vertical movement relative to the cross member.

4. The installation according to claim 3 further including a second base movable transversely of said transfer line into and out of a lower part of said second gantry below the elevated frame thereof, said second base carrying positioning members for said parts.

* * * * *